UNITED STATES PATENT OFFICE.

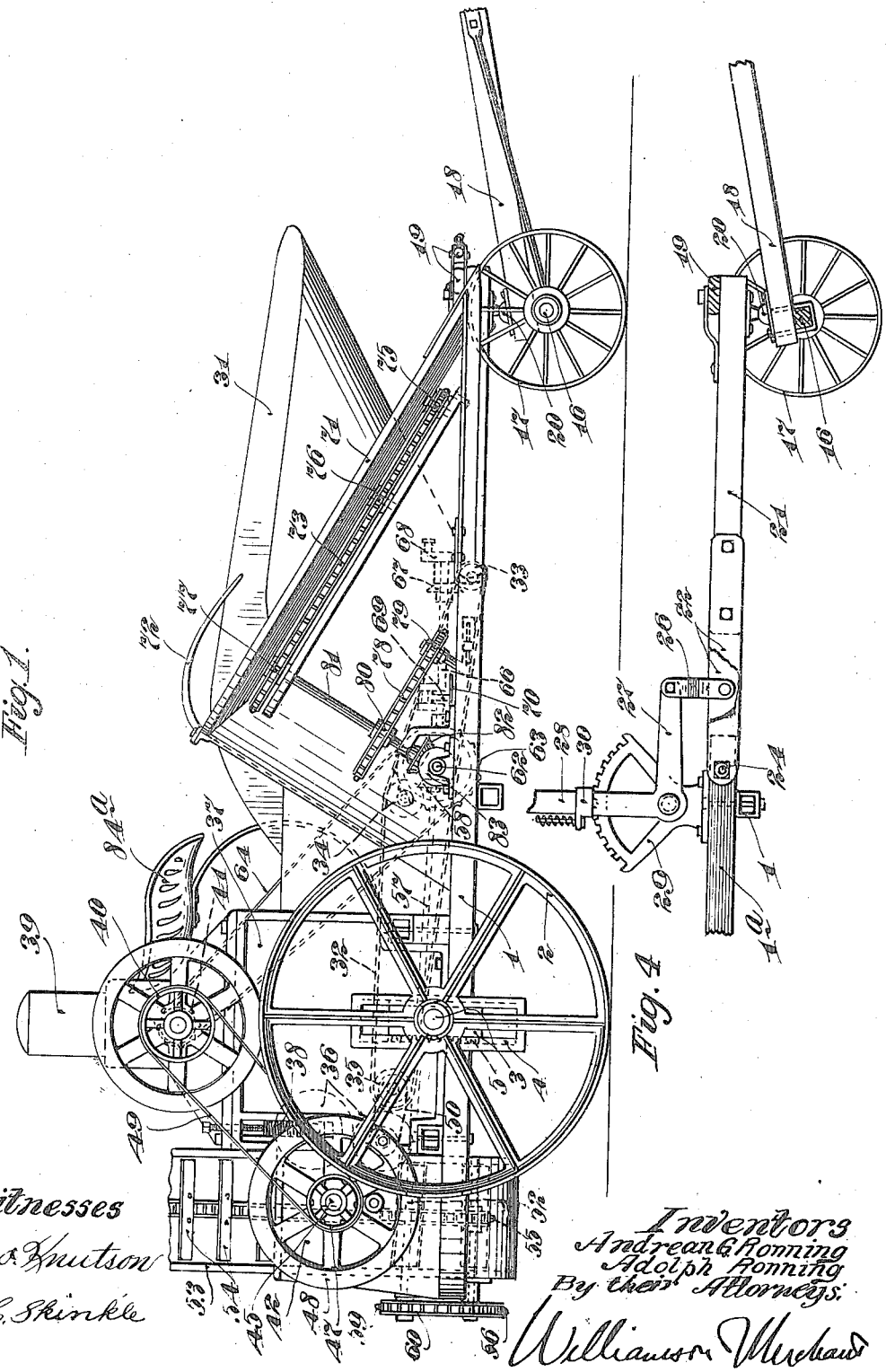

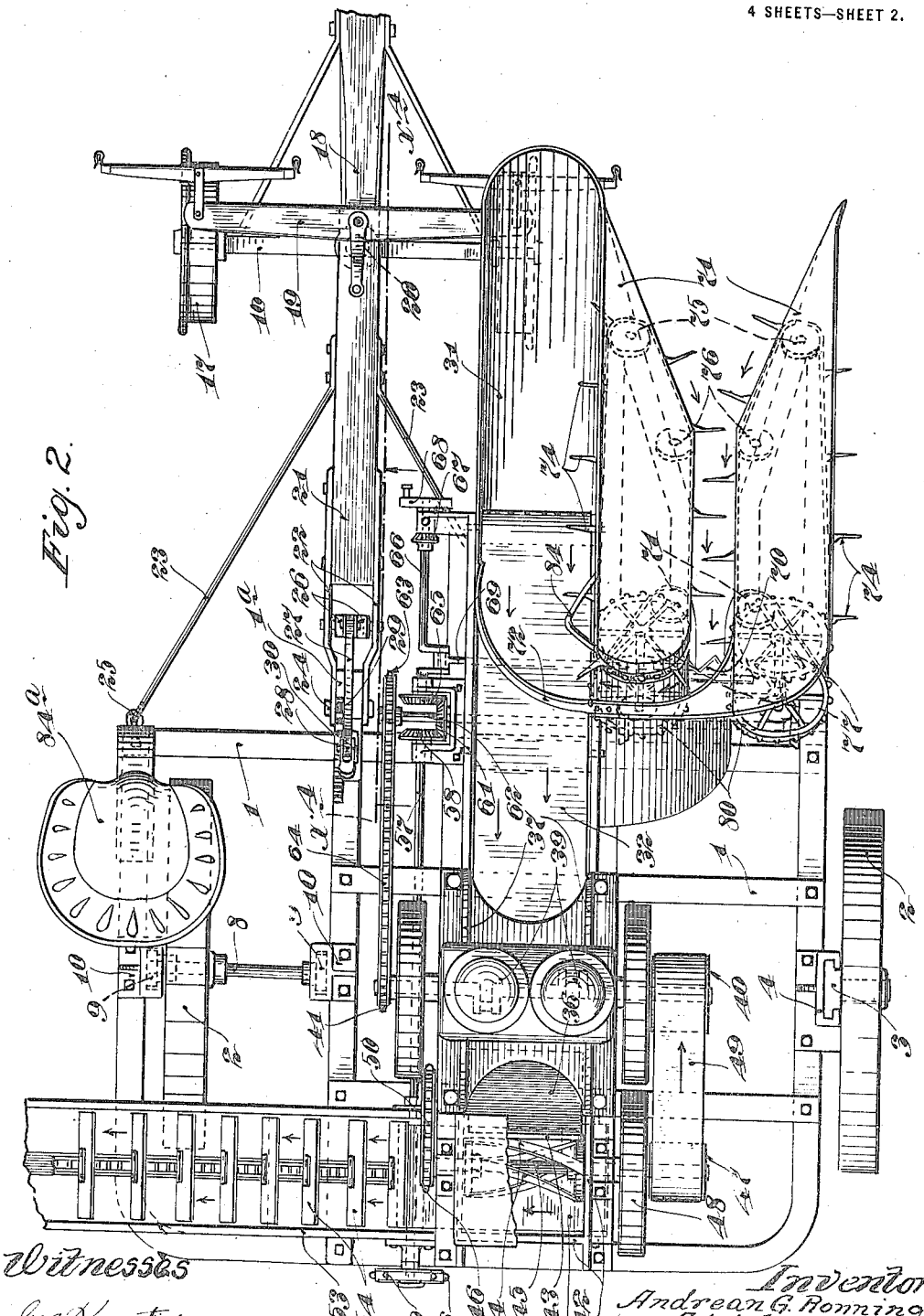

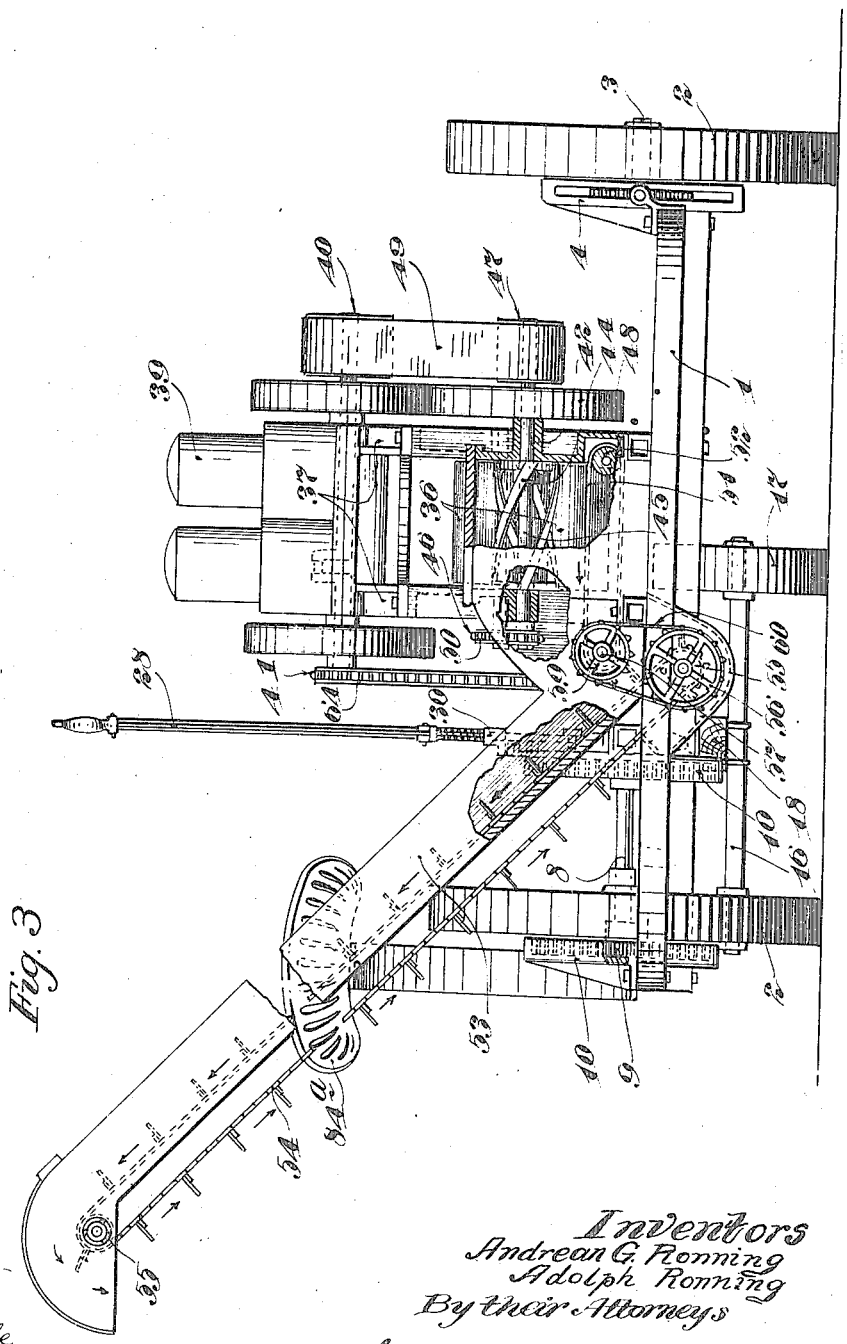

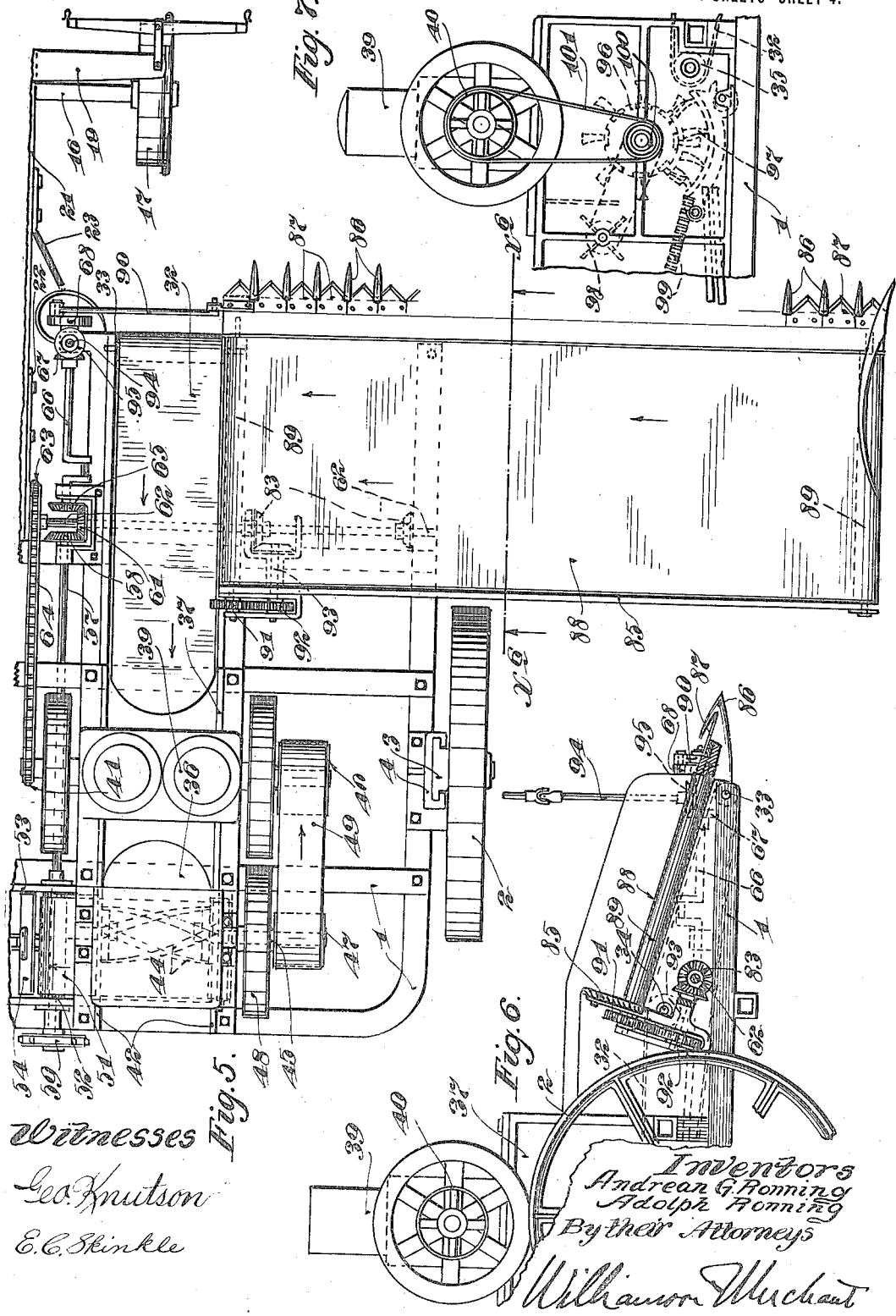

ANDREAN G. RONNING AND ADOLPH RONNING, OF BOYD, MINNESOTA.

ENSILAGE-HARVESTER.

1,161,252.

Specification of Letters Patent.

Patented Nov. 23, 1915.

Application filed July 14, 1913. Serial No. 778,872.

*To all whom it may concern:*

Be it known that we, ANDREAN G. RONNING and ADOLPH RONNING, citizens of the United States, residing at Boyd, in the county of Lac qui Parle and State of Minnesota, have invented certain new and useful Improvements in Ensilage-Harvesters; and we do hereby declare the following to be a full, clear, and exact description of the invention, such as will enable others skilled in the art to which it appertains to make and use the same.

Our invention has for its object to provide a highly efficient combination harvester having various interchangeably usable attachments adapting the machine to do various different kinds of work. For instance, with one attachment, it may be used to harvest corn and cut the same into ensilage, and deposit the same in the box of a wagon driven by the side of the machine. By the use of another attachment, the machine may be used to cut alfalfa, clover, or hay, and cut the same into ensilage. By the use of this same last noted attachment, but with the ensilage cutter removed, the machine may be used as a header to harvest grain. When this same attachment is used with a threshing attachment substituted for the ensilage cutter, the machine may be used as a combined harvester and thresher.

In the accompanying drawings which illustrate the invention, like characters indicate like parts throughout the several views.

Referring to the drawings: Figure 1 is a side elevation of the improved machine, with the corn harvester attachment applied thereto; Fig. 2 is a plan view of the machine, some parts being broken away; Fig. 3 is a rear elevation of the machine, with some parts broken away; Fig. 4 is a detail in vertical section taken approximately on the line $x^4$ $x^4$ on Fig. 2, some parts being broken away; Fig. 5 is a plan view of the machine with the so-called alfalfa attachment connected to the machine instead of the corn cutting attachment, some parts of the machine being broken away and some parts being removed; Fig. 6 is a fragmentary view taken in section approximately on the line $x^6$ $x^6$ on Fig. 5; and Fig. 7 is a side elevation showing the threshing attachment, some parts thereof, being broken away.

The general construction of the machine and of the corn harvesting attachment illustrated in Figs. 1 to 4 inclusive, will first be described. The main frame 1 of the machine is carried by and nearly balanced on the rear wheels 2. The right hand wheel 2 is journaled to a vertically extended bearing 3 that is mounted to slide vertically in a yoke 4 that is rigidly secured to the adjacent side of the main frame. The left hand wheel 2 is loosely journaled on a short axle 8. This axle 8, at its ends, has small spur gears 9 that work vertically in guide brackets 10 secured on the frame 1, and provided with rack teeth with which the said gears is engaged. Any suitable or well known means, not necessary for the purpose of this case to consider, may be used for raising and lowering the main frame in respect to the main wheels. The machine is provided with a front truck, which, as shown, is made up of a front axle 16, front wheels 17, and a pole 18. An equalizer 19 is shown as applied to the front truck, so that the horses or draft animals may be hitched thereto. The left hand front wheel 17 is approximately alined with the left hand wheel 2, but the right hand front wheel is alined approximately with the central portion of the main frame, or in other words, travels midway between the two rear wheels. The axle 16 of the front truck is pivotally attached at 20 to the front end of a reach beam 21. This reach beam 21 is connected to the front of the main frame with freedom for vertical pivotal adjustments, and, as shown, this is accomplished by providing the said reach beam with rearwardly projecting metallic straps 22 and brace rods 23, the rear ends of which are pivotally connected to the said main frame, respectively, at 24, and 25. Links 26 connect the intermediate portion of the so-called reach beam 21, to the forwardly projecting arm 27 of a latch lever 28, which latter is pivoted to a latch segment 29, rigidly secured to a forwardly projecting intermediate beam 1ª of the main frame, as best shown in Figs. 2 and 4. The latch lever 28 is provided with the usual latch piece 30, that is engageable with the notches of the latch segment 29, to secure the lever in any set adjustment. By oscillatory movements of the lever 28, the front portion of the main frame, and the rear portion of the reach 21 may be raised and lowered with a sort of a toggle action.

The numeral 31 indicates a receiving hopper which is preferably constructed from sheet metal, and is extended longitudinally of the machine and rigidly, but detachably secured to the main frame 1, so that it moves vertically with the main frame, and, in fact, partakes of all of the movements of the main frame. This receiving hopper 31 has a rearwardly inclined front portion and is open at its rear end, and, of course, also at its top. It is held in a position at the right of the reach 21, and very much to the left of the right hand wheel 2, and projects far in front of the main frame. The main portion of the bottom of the hopper 31, is formed by an endless belt conveyer 32 that extends from the said hopper nearly to the rearmost portion of the machine and is arranged to run over suitable guide rollers 33, 34 and 35, suitably mounted on the main frame. The endless conveyer 32 delivers to a pair of coöperating feed rollers 36 shown as mounted in laterally spaced bearing plates 37 that are rigidly secured on the main frame 1. The upper roller 36 is yieldingly pressed downward by adjustable springs 38, shown only in Fig. 1. An explosive engine, which is indicated as an entirety by the numeral 39, is supported on the bearing plates 37, and its shaft is provided at one end with a pulley 40, and at its other end, with a sprocket 41.

The feed rollers 36 deliver to an ensilage cutter, which is mounted on a supplemental frame 42 bolted, or otherwise rigidly, but detachably secured to the main frame. This ensilage cutter, as shown, comprises a fixed shearing blade 43 and a rotary cutter 44, the shaft 45 of which latter projects and is provided at one end with a sprocket 46 and at its other end with a pulley 47 and fly wheel 48. A belt 49 runs over the engine pulley 40, and over the pulley 47 to transmit motion from the engine shaft to the rotary cutter 44. The feed rollers 36 and the roller 35, which drives the conveyer belt 32, are all driven from the shaft of the rotary cutter 44, and directly from the sprocket 46 through a sprocket and chain drive 50.

The ensilage from the cutter 44 falls upon a short endless conveying belt 51 that runs over suitable guide rollers 52 mounted on the main frame 1. The belt 51 delivers to the lower portion of an inclined elevator deck 53 that is rigidly but detachably secured to the main frame 1 by bolts, or otherwise, and extends to a point at one side of the machine high enough to deliver into the box of a wagon driven at the side of the machine. An endless elevator belt 54 runs over and under the deck 53 and up over upper and lower guide rollers 55 mounted on the said deck structure. The shaft of the lower roller 55 has a sprocket 56. The left hand roller 52, over which the belt 51 runs, is secured to the rear end of a shaft 57 which is mounted in suitable bearings on the main frame 1 and provided at its front end with a beveled gear 58. The rear end of the shaft 57 projects and is provided with a sprocket 59, over which, and the sprocket 56, runs a short sprocket chain 60 (see particularly Fig. 3). The beveled gear 58 meshes with a beveled gear 61 on a transverse counter shaft 62, journaled in suitable bearings on the front portion of the main frame 1. At its left hand end, the shaft 62 is provided with a sprocket 63. A sprocket chain 64 runs over the said sprocket 63 and over the sprocket 41 on the engine crank shaft.

The gear 61 of the shaft 62 meshes with the beveled gear 65 on the rear end of a pitman driving crank shaft 66 mounted in suitable bearings on the forwardly projecting central portion of the main frame 1, and said shaft is provided at its front end with a beveled pinion 67 and a crank 68. The rear crank of shaft 66 (see Figs. 1 and 2), is connected to a pitman 69 that drives a sickle 70, that is adapted for use in cutting corn. This sickle 70 is of the usual well known construction and is mounted in suitable bearings on the front right hand portion of the main frame 1.

Rigidly, but detachably secured by bolts, or otherwise, to the main frame 1, immediately at the right of the hopper 31, is a pair of laterally spaced approximately triangular so-called gathering frames 71. The top boards or plates of these gathering frames 71 incline forwardly and their front inner edges diverge so as to guide the standing corn stalks into the channel left between said gathering frames. The top plate of the outer gathering frame 71 has a curved guide arm 72, that overlies the rear portion of the hopper 31, and serves to direct the corn stalks after they have been cut by the sickle 70 into the said hopper 31. The above noted movements of the corn stalks into the hopper after they have been cut, is further insured by endless conveyers in the form of sprocket chains provided with projecting teeth. As shown, there are four of these sprocket chains, all obliquely arranged and positively driven through connections which will presently be described. The relatively long upper inner and outer sprocket chains 73 are provided with projecting teeth 74, and they are arranged to run over sprockets 75, 76 and 77, mounted on the gathering frames 71. The relatively short lower sprocket chains 78 are arranged to run over sprockets 79 and 80, also mounted on the gathering frame 71. The sprockets 75, 76 and 79 are idle sprockets, but the sprockets 77 and 80 are driving sprockets that are secured on oblique shafts 81 provided at their lower ends with beveled gears 82 that mesh with beveled gears 83 and the transverse counter shaft 62.

The numeral 84 indicates a stripper applied to the inner gathering frame 71 and adapted to release the teeth 74 of the inner top conveyer chain 73 from the corn stalks which have been delivered into the hopper 31.

The numeral 84ª indicates a driver's seat, shown as suitably applied to the left hand side of the main frame 1.

The operation of the machine with the corn harvesting attachment applied, as above described, is as follows: All of the running parts of the machine are driven from an explosive engine, while the machine is preferably drawn forward by horses. Of course, the well known connections might be provided between the engine and the main wheels 2, for driving the latter, thus converting it into a regular tractor. Under the forward movement of the machine, the standing corn stalks are directed to the sickle 70 by the gathering frames 71 and feed chains 73 and 78, and the cut stalks are then forced into oblique position and deposited in the hopper 31 with their butt ends resting on the conveyer belt 32. From the belt 32, the corn stalks are delivered between the feed rollers 36, and thence, are directed to the ensilage cutter 43—44. The cut silage, as already noted, drops onto the horizontal feed belt 51, and by the latter is delivered to the elevator belt 53, and thence, into the box of the wagon driven at the side of the machine. When the machine is to be used to cut alfalfa, clover, or hay for example, the hopper 31 and the gathering frames 71, as entireties, and the parts mounted thereon, are bodily removed, and the sickle 70 is disconnected from the crank shaft 66. Then an attachment in the form of a binder platform with attached sickle bar and sickle, is substituted for said gathering frame 71, and is bolted, or otherwise rigidly secured to the forwardly projecting right hand portion of the main frame 1. This latter noted attachment, which, for convenience, is designated as an alfalfa attachment, comprises a deck frame 85, having at its front edge the usual finger bar 86 and sickle bar 87. An endless platform belt 88 runs over guide rolls 89 on the outer and inner ends of the deck frame 85, and is so arranged that its inner portion will deliver the cut alfalfa, clover, hay, or the like, directly onto the endless conveyer belt 32, so that the cut alfalfa, or the like, will be delivered to the cutter 44, and from thence, carried by the conveyers 51 and 53 into the box of a wagon driven at the side of the machine. When the alfalfa attachment is applied, as just described, its sickle bar 87 is connected by a pitman 90 to the crank 68 on the front end of the crank shaft 66. To drive the platform belt 88 the shaft of the inner roller 89 is provided with a spur gear 91, that meshes with the spur gear 92, (see Fig. 5), carried by the rear end of a short shaft 93, journaled in a suitable bearing on the deck frame 85 and having a beveled gear in mesh with the innermost of the two gears 83, which, as already described, are carried by the counter shaft 62.

In Fig. 6, we have shown a part of a connection for driving a reel, not shown, but which would preferably be used in connection with the alfalfa attachment. Of the parts thereof, the numeral 94 indicates a jointed shaft having at its lower end a beveled gear 95 that is then arranged to mesh with the beveled gear 67 on the front end of the crank shaft 66. When it is to be used as a combined harvester and thresher, the supplemental frame 42 and cutting elements 43 and 44 are removed, and the threshing attachment shown in Fig. 7 is substituted therefor. This threshing attachment comprises a toothed cylinder 96, a coöperating toothed concave 97, a beater 98, a grate 99, and certain other devices, such as usually employed in threshing mechanism. In this instance, the shaft of the cylinder 96 is provided with a pulley 100, over which, and the engine pulley 40 runs a driving belt 101. Also, at this time, the elevator deck 53 and elevator belt or conveyer 54 may as well be removed. It will also be understood that the harvester described may be used while stationary to cut silage in the one instance, or to thresh grain in the other instance. In either instance, the connections for driving the sickle and coöperating harvesting mechanism should be thrown out of action, which may be done in several different ways, as for instance, by disconnecting one of the sprocket chains.

What we claim is:

1. In a harvester, the combination with an ensilage cutter and a stalk cutter, of means for turning the severed stalks into approximately horizontal positions and feeding the same, butt ends first, to said ensilage cutter.

2. In a harvester, the combination with an ensilage cutter and a stalk cutter, of means for turning the severed stalks into approximately horizontal positions and feeding the same, butt ends first, to said ensilage cutter, and an engine on said harvester having connections for driving said stalk cutter and ensilage cutter.

3. In a harvester, the combination with a stalk cutter, of an ensilage cutter located at the rear of said stalk cutter, means for turning the severed stalks into approximately horizontal positions with their butt ends rearward, and means for feeding said stalks rearward, butt ends first, to said ensilage cutter.

4. In a harvester, the combination with a stalk cutter, of an ensilage cutter located at the rear of said stalk cutter, means for turning the severed stalks into approximately horizontal positions with their butt ends rearward, means for feeding said stalks rearward, butt ends first, to said ensilage cutter, and an engine on said harvester having connections for driving said stalk cutter and ensilage cutter.

5. In a harvester, the combination with a stalk cutter and a hopper at one side thereof, of a deflecting arm for directing the severed stalks into said hopper, butt ends rearward, an ensilage cutter on the harvester located at the rear from said hopper, and a feed device for delivering the stalks, butt ends rearward, from said hopper to said ensilage cutter.

6. In a havester, the combination with a stalk cutter and a hopper at one side thereof, of a deflecting arm for directing the severed stalks into said hopper, butt ends rearward, an ensilage cutter on the harvester located at the rear from said hopper, a feed device for delivering the stalks, butt ends rearward, from said hopper to said ensilage cutter, and an engine on said harvester having connections for driving said stalk cutter, ensilage cutter and feed device.

7. In a harvester, the combination with a stalk cutter and a hopper at one side thereof, of a deflecting arm for directing the severed stalks into said hopper, butt ends rearward, an ensilage cutter on the harvester located at the rear from said hopper, a feed device for delivering the stalks, butt ends rearward, from said hopper to said ensilage cutter, and coöperating toothed endless stalk carriers for directing the stalks to said stalk cutter and coöperating with said guide arm to direct the severed stalks into said hopper.

8. In a harvester, the combination with a stalk cutter and a hopper at one side thereof, of a deflecting arm for directing the severed stalks into said hopper, butt ends rearward, an ensilage cutter on the harvester located at the rear from said hopper, a feed device for delivering the stalks, butt ends rearward, from said hopper to said ensilage cutter, coöperating toothed endless stalk carriers for directing the stalks to said stalk cutter and coöperating with said guide arm to direct the several stalks into said hopper, and an engine on said harvester having connections for driving said stalk cutter, ensilage cutter, feed device and endless stalk carriers.

9. A harvester having a detachable hopper and a coöperating detachable stalk cutter and associated devices cutting the severed stalks to be delivered into said hopper.

10. In a harvester, the combination with longitudinal and lateral feeding devices and coöperating means for turning the severed stalks approximately horizontal, butt ends rearward, of a stalk cutter, and an ensilage cutter, the latter being interposed between the said longitudinal and lateral feed devices.

11. In a harvester, the combination with longitudinal and lateral feeding devices and coöperating means for turning the severed stalks approximately horizontal, butt ends rearward, of a stalk cutter, and an ensilage cutter, the latter being interposed between the said longitudinal and lateral feed devices, and an engine carried on said harvester and having connections for driving said stalk cutter, ensilage cutter and longitudinal and lateral feed devices.

12. In a harvester, the combination with a receiving hopper at the front of the machine, of a stalk cutter and a stalk conveyer at the side of said hopper, means coöperating with said stalk conveyers to turn the same forward into said hopper, butt ends rearward, an ensilage cutter directly at the rear of said hopper, and a conveyer belt receiving the stalks from said hopper and delivering the same butt ends rearward from said ensilage cutter.

13. In a harvester, the combination with a rearwardly inclined hopper and a conveyer belt extending rearward from the open bottom of said hopper, of an ensilage cutter receiving from said conveyer, and stalk gathering feeding and cutting devices at the side of said hopper including means for turning the severed stalks forward into said hopper, butt ends rearward.

14. In a harvester, the combination with an inclined hopper and a conveyer belt extending rearward from the bottom thereof, of a coöperating stalk cutting device and endless toothed conveyers at the sides of said hopper and arranged to deliver the cut stalks into said hopper and onto said conveyer belt, the said gathering devices and coöperating toothed conveyers being set to run in forwardly inclined planes, and the outer gathering devices, at the rear portion having a curved arm overlying the receiving portion of said conveyer belt.

In testimony whereof we affix our signatures in presence of two witnesses.

ANDREAN G. RONNING.
ADOLPH RONNING.

Witnesses:
HARRY D. KILGORE,
F. D. MERCHANT.